(12) United States Patent
Reed et al.

(10) Patent No.: US 11,172,653 B1
(45) Date of Patent: Nov. 16, 2021

(54) SQUIRREL REPELLING BIRD FEEDER

(71) Applicants: John Reed, Fayetteville, NC (US); Undrella Reed, Fayetteville, NC (US)

(72) Inventors: John Reed, Fayetteville, NC (US); Undrella Reed, Fayetteville, NC (US)

( * ) Notice: Subject to any disclaimer, the term of this patent is extended or adjusted under 35 U.S.C. 154(b) by 66 days.

(21) Appl. No.: 16/747,605

(22) Filed: Jan. 21, 2020

(51) Int. Cl.
*A01K 39/00* (2006.01)

(52) U.S. Cl.
CPC .................................. *A01K 39/00* (2013.01)

(58) Field of Classification Search
CPC ...... A01K 39/0113; A01K 1/04; A01K 39/01; A01K 31/14; A63B 69/0079; A63B 71/023; A63B 67/10; A63B 2210/50; A47J 33/00; A47J 27/0763
See application file for complete search history.

(56) References Cited

U.S. PATENT DOCUMENTS

| D174,139 S | 3/1955 | Sadler |
| 5,207,180 A | 5/1993 | Graham |
| 5,313,910 A | 5/1994 | Wittman |
| 5,642,687 A | 7/1997 | Nylen |
| 7,185,606 B1 * | 3/2007 | Racine .................. A01K 39/00 119/52.2 |
| 8,104,430 B1 | 1/2012 | Powell, Jr. |
| 8,413,605 B2 | 4/2013 | Baynard |
| 9,222,617 B1 | 12/2015 | Kanuk |
| 10,349,634 B2 | 7/2019 | Rawls |
| 2003/0019436 A1 | 1/2003 | Nicholas |
| 2015/0201798 A1 * | 7/2015 | Begotka .................... F24C 1/16 426/523 |
| 2018/0360000 A1 * | 12/2018 | Cahill ................ A01K 39/0113 |

FOREIGN PATENT DOCUMENTS

| GB | 2484686 | 9/2012 |
| GB | 2466636 | 12/2012 |

* cited by examiner

*Primary Examiner* — Monica L Barlow
*Assistant Examiner* — Brittany A Lowery
(74) *Attorney, Agent, or Firm* — Kyle A. Fletcher, Esq.

(57) ABSTRACT

The squirrel repelling bird feeder comprises a first pole section, a second pole section, a cable, a baffle, and a bird feeder. The squirrel repelling bird feeder may be adapted to feed birds from the bird feeder. The bird feeder may be suspended above the ground via the first pole section and the second pole section. The baffle may prevent squirrels from accessing bird seed in the bird feeder. The bird feeder may be lowered via the cable for refilling. The feeder may be retained in an elevated position by securing an end of the cable to an anchor located on the second pole.

16 Claims, 4 Drawing Sheets

SQUIRREL REPELLING BIRD FEEDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of bird feeders, more specifically, a squirrel repelling bird feeder.

SUMMARY OF INVENTION

The squirrel repelling bird feeder comprises a first pole section, a second pole section, a cable, a baffle, and a bird feeder. The squirrel repelling bird feeder may be adapted to feed birds from the bird feeder. The bird feeder may be suspended above the ground via the first pole section and the second pole section. The baffle may prevent squirrels from accessing bird seed in the bird feeder. The bird feeder may be lowered via the cable for refilling. The feeder may be retained in an elevated position by securing an end of the cable to an anchor located on the second pole.

An object of the invention is to feed birds from a bird feeder.

Another object of the invention is to thwart squirrels by retaining the bird feeder in an elevated position and by providing a baffle on the pole that supports the bird feeder.

A further object of the invention is to provide the ability to lower the bird feeder for refilling by moving a cable that is routed through one of the support poles.

Yet another object of the invention is to secure one end of the cable to the bird feeder and the other end of the cable to a cable termination that is secure to an anchor on the support pole.

These together with additional objects, features and advantages of the squirrel repelling bird feeder will be readily apparent to those of ordinary skill in the art upon reading the following detailed description of the presently preferred, but nonetheless illustrative, embodiments when taken in conjunction with the accompanying drawings.

In this respect, before explaining the current embodiments of the squirrel repelling bird feeder in detail, it is to be understood that the squirrel repelling bird feeder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the squirrel repelling bird feeder.

It is therefore important that the claims be regarded as including such equivalent construction insofar as they do not depart from the spirit and scope of the squirrel repelling bird feeder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
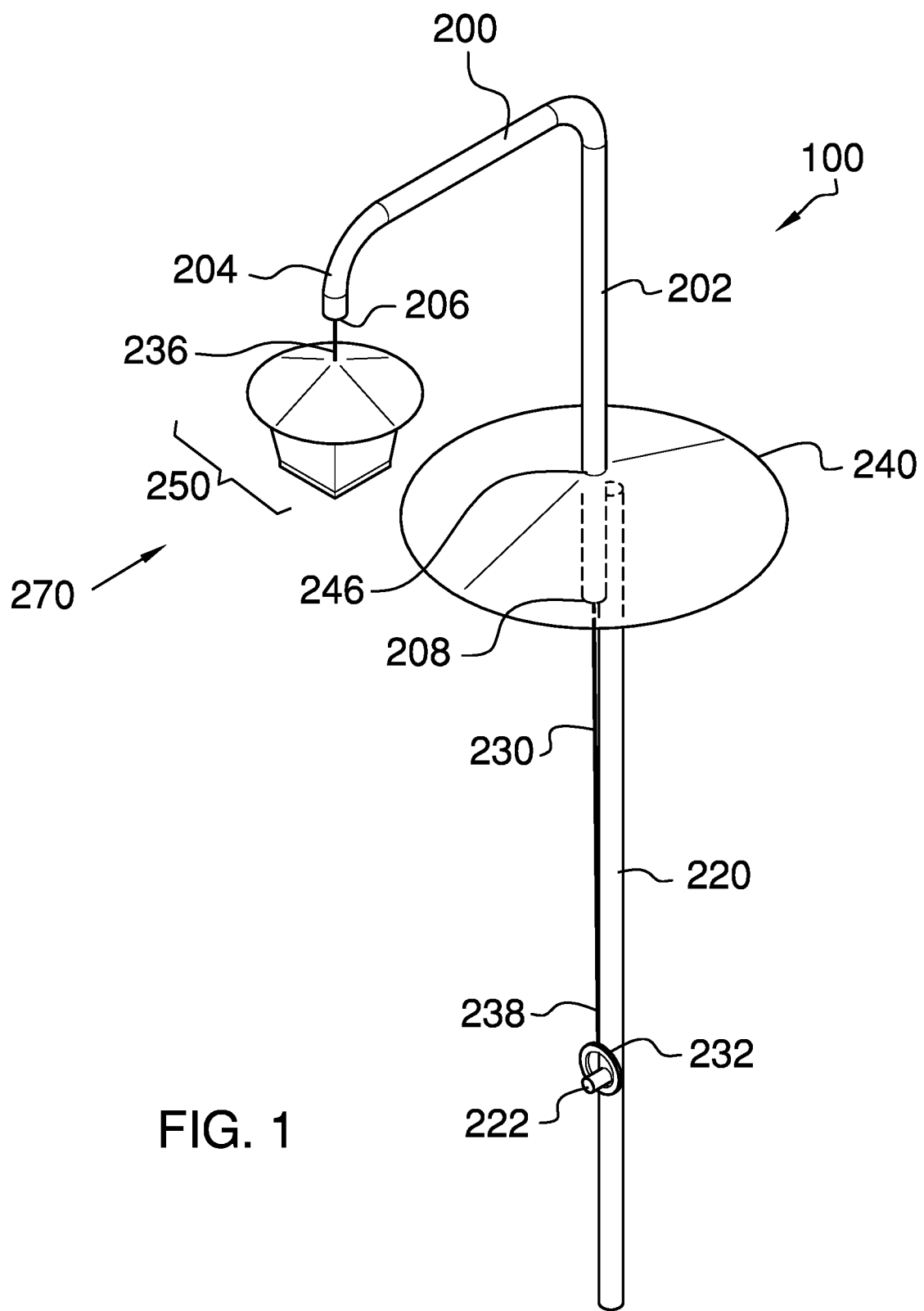
FIG. 1 is an isometric view of an embodiment of the disclosure illustrating the bird feeder in the elevated position.
Figure 2:
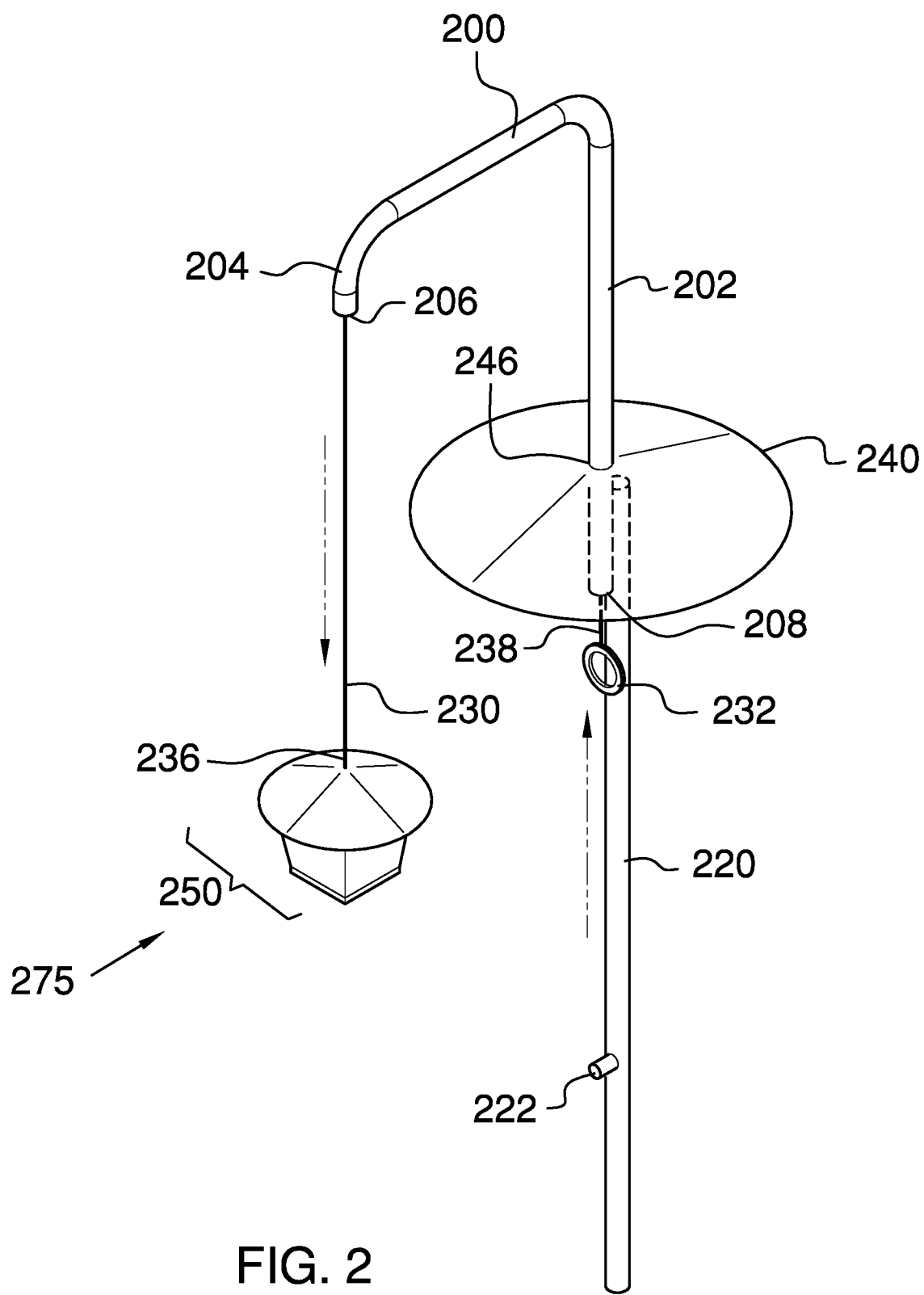
FIG. 2 is an isometric view of an embodiment of the disclosure illustrating the bird feeder in the lowered position.
Figure 3:
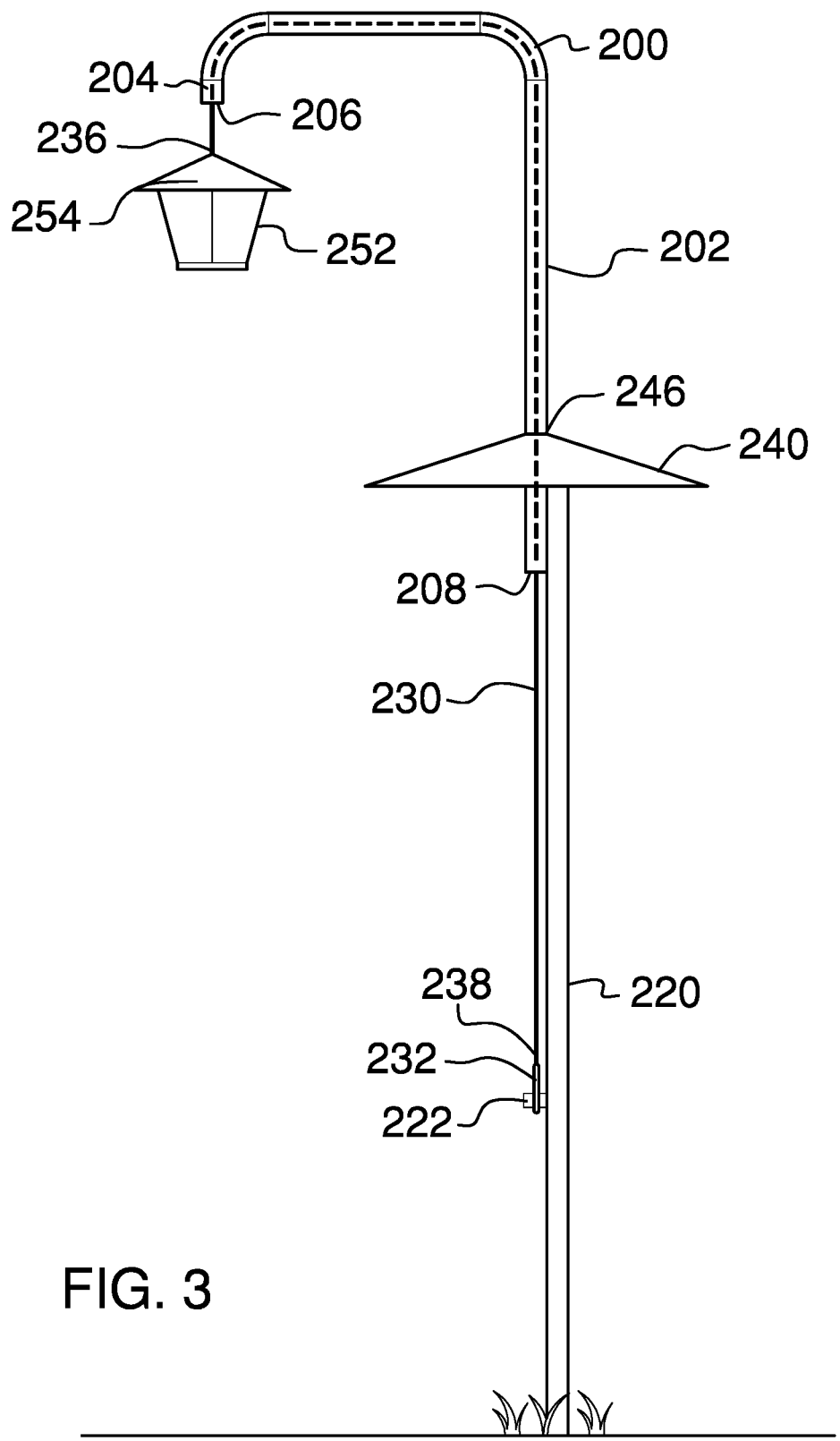
FIG. 3 is a side view of an embodiment of the disclosure.
Figure 4:
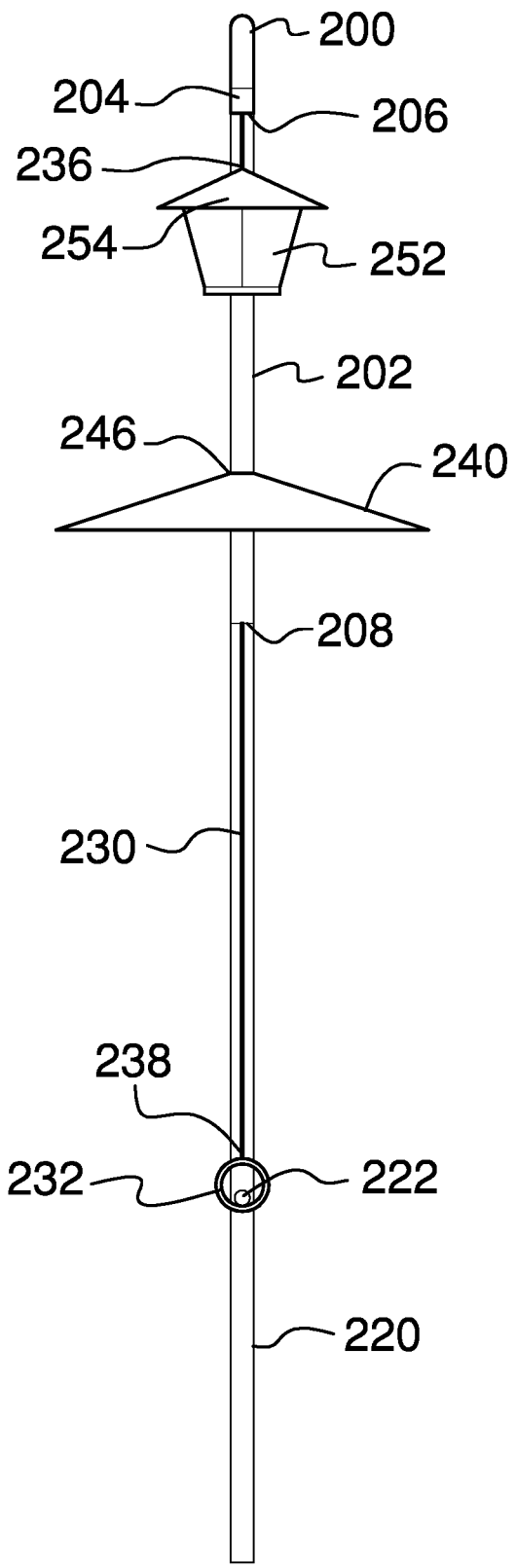
FIG. 4 is a front view of an embodiment of the disclosure.

Detailed reference will now be made to a first potential embodiment of the disclosure, which is illustrated in FIGS. 1 through 4.

The squirrel repelling bird feeder 100 (hereinafter invention) comprises a first pole section 200, a second pole section 220, a cable 230, a baffle 240, and a bird feeder 250. The invention 100 may be adapted to feed birds from the bird feeder 250. The bird feeder 250 may be suspended above the ground via the first pole section 200 and the second pole section 220. The baffle 240 may prevent squirrels from accessing bird seed in the bird feeder 250. The bird feeder 250 may be lowered for refilling via the cable 230.

The first pole section 200 may be a hollow tube in the shape of an inverted 'J'. A longer leg 202 of the first pole section 200 may extend downward from the top of the second pole section 220. The bottom of the longer leg 202 of the first pole section 200 may be attached to the top of the second pole section 220 by coupling the side of the longer leg 202 to the side of the second pole section 220. As non-limiting examples, the coupling of the longer leg 202 to the second pole section 220 may be made via one or more welds, one or more clamps, an adhesive, mounting hardware, or combinations thereof. A shorter leg 204 of the first pole section 200 may extend downward and may terminate at a height that is above the height of the bottom of the longer leg 202.

A first aperture 206 may provide access to the hollow interior of the first pole section 200 at the bottom of the shorter leg 204. A second aperture 208 may provide access to the hollow interior of the first pole section 200 at the bottom of the longer leg 202. An unobstructed path through the hollow interior of the first pole section 200 may exist from the first aperture 206 to the second aperture 208.

The second pole section 220 may be a straight shaft that supports the first pole section 200 at an elevated position 270. The bottom of the second pole section 220 may be planted into the ground and oriented vertically to hold the invention 100 upright. The second pole section 220 may comprise an anchor 222. The anchor 222 may be located on the side of the second pole section 220 directly beneath the bottom of the longer leg 202 of the first pole section 200. The distance between the bottom of the longer leg 202 and the anchor 222 may correspond to the distance that the bird feeder 250 may drop for refilling. The anchor 222 may prevent the cable 230 from sliding through the first pole section 200 when a cable lower termination 232 is coupled to the anchor 222. As non-limiting examples, the anchor 222 may comprise a peg or an inverted hook. The inverted hook may be a hook coupled to the side of the second pole section 220 with the gap of the inverted hook exposed on the bottom of the inverted hook.

The cable 230 may couple the bird feeder 250 to the anchor 222 on the second pole section 220 in order to suspend the bird feeder 250 out of reach of the squirrels. Specifically, a first cable end 236 may couple to the bird feeder 250 and a second cable end 238 may couple to the cable lower termination 232. The cable lower termination 232 may couple to the anchor 222 on the second pole section 220 to hold the bird feeder 250 at the elevated position 270 by preventing the cable 230 from moving. The cable lower termination 232 may decouple from the anchor 222 to permit the weight of the bird feeder 250 to pull the cable 230 through the first pole section 200, thus lowering the bird feeder 250 to a lowered position 275. Movement of the cable 230 may be limited by the inability of the cable lower termination 232 to pass through the first pole section 200. In some embodiments, the cable lower termination 232 may be an annular ring.

The baffle 240 may be a barrier to prevent the squirrels from climbing to the bird feeder 250. The baffle 240 may be a circular plate that comprises a central aperture 246. The first pole section 200 may pass through the central aperture 246. The baffle 240 may be held above ground level at a height that is below the bird feeder 250 by resting on top of the second pole section 220. In some embodiments, the outside edge of the baffle 240 may be warped downwards such that the baffle 240 forms an inverted cone.

The bird feeder 250 may comprise a feed-dispensing body 252 and a roof 254. The bird feeder 250 may be a dispenser for the bird seed. The bird feeder 250 may be suspended beneath the shorter leg 204 such that the bird feeder 250 is horizontally separated from the longer leg 202 and from the second pole section 220 when the bird feeder 250.

The feed-dispensing body 252 may be a container for the bird seed. The feed-dispensing body 252 may comprise one or more perches that are adapted for the birds to land upon. The bird seed may be dispensed through one or more seed apertures located on the feed-dispensing body 252.

The roof 254 may cover the bird seed to protect the bird seed from the weather. The roof 254 may detach from the feed-dispensing body 252 so that the bird seed may be placed into the feed-dispensing body 252.

In some embodiments, the cable 230 may be detachable from the bird feeder 250 such that the baffle 240 may detach from the first pole section 200. In some embodiments, the first pole section 200 may be detachable from the second pole section 220. This may allow the baffle 240, the bird feeder 250 the first pole section 200 and the second pole section 220 to be shipped separately and assembled for use.

In use, the invention 100 may be assembled if the invention shipped dissembled. To assemble, the first pole section 200 may be coupled to the top of the second pole section 220. The cable 230 may be inserted into the second aperture 208 of the first pole section 200 and passed through the first pole section 200 until the first cable end 236 of the cable 230 emerges from the first aperture 206. The first cable end 236 of the cable 230 may be coupled to the bird feeder 250.

The bottom of the second pole section 220 may be planted into the ground to hold the second pole section 220 in a vertical orientation. The bird feeder 250 may be moved to the lowered position 275 by detaching the cable lower termination 232 from the anchor 222 and allowing the weight of the bird feeder 250 to pull the cable 230 through the first pole section 200. The movement may be limited by the cable lower termination 232 reaching the first pole section 200 and not being able to pass through the first pole section 200. The roof 254 may be detached from the feed-dispensing body 252 and the bird seed may be placed into the feed-dispensing body 252. The roof 254 may be attached to the feed-dispensing body 252 to cover the bird seed. The bird feeder 250 may be raised to the elevated position 270 by pulling the cable lower termination 232 down to draw the cable 230 through the first pole section 200. The cable lower termination 232 may be coupled to the anchor 222 on the second pole section 220 to hold the bird feeder 250 in the elevated position 270.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "anchor" is a device that holds an object in place. When used as a verb, "anchor" refers to holding an object firmly or securely.

As used in this disclosure, an "aperture" is an opening in a surface. Aperture may be synonymous with hole, slit, crack, gap, slot, or opening.

As used in this disclosure, the word "correspond" indicates that a first object is in some manner linked to a second object in a one to one relationship or that one or more properties shared by two or more objects match, agree, or align within acceptable manufacturing tolerances.

As used herein, the words "couple", "couples", "coupled" or "coupling", refer to connecting, either directly or indirectly, and does not necessarily imply a mechanical connection.

As used herein, "filling", or "refilling", refers to the act of placing a first item into a second item whether the quantity of the first item fills the second item or not. As non-limiting examples, the first item may be a liquid, such as water or gasoline, or a granulated solid, such as sand or coffee beans. As non-limiting examples, the second item may be a bin, a bottle, a tank, or another type of container.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "interior" is used as a relational term that implies that an object is located or contained within the boundary of a structure or a space.

As used herein, the words "invert", "inverted", or "inversion" refer to an object that has been turned inside out or upside down or to the act of turning an object inside out or upside down.

As used herein, "mounting hardware" refers to mechanical devices that are used to attach one object to another, including devices whose only purpose is to improve aesthetics. As non-limiting examples, mounting hardware may include screws, nuts, bolts, washers, rivets, crossbars, hooks, collars, nipples, standoffs, knobs, caps, plates, rails, and brackets.

As used in this disclosure, "orientation" refers to the positioning and/or angular alignment of a first object relative to a second object or relative to a reference position or reference direction.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A squirrel repelling bird feeder comprising:
   a first pole section, a second pole section, a cable, a baffle, and a bird feeder;
   wherein the squirrel repelling bird feeder is adapted to feed birds from the bird feeder;
   wherein the bird feeder is suspended above the ground via the first pole section and the second pole section;
   wherein the baffle prevents squirrels from accessing bird seed in the bird feeder;
   wherein the bird feeder is lowered for refilling via the cable;
   wherein the baffle is a barrier to prevent the squirrels from climbing to the bird feeder;
   wherein the baffle is a circular plate that comprises a central aperture;
   wherein the first pole section passes through the central aperture;
   wherein the baffle is held above ground level at a height that is below the bird feeder by resting on top of the second pole section;
   wherein the first pole section is a hollow tube in the shape of an inverted 'J';
   wherein a longer leg of the first pole section extends downward from the top of the second pole section;
   wherein the bottom of the longer leg of the first pole section is attached to the top of the second pole section by coupling the side of the longer leg to the side of the second pole section.

2. The squirrel repelling bird feeder according to claim 1 wherein the coupling of the longer leg to the second pole section is made via one or more welds, one or more clamps, an adhesive, mounting hardware, or combinations thereof.

3. The squirrel repelling bird feeder according to claim 1 wherein a shorter leg of the first pole section extends downward and terminates at a height that is above the height of the bottom of the longer leg.

4. The squirrel repelling bird feeder according to claim 3 wherein a first aperture provides access to the hollow interior of the first pole section at the bottom of the shorter leg;
   wherein a second aperture provides access to the hollow interior of the first pole section at the bottom of the longer leg;
   wherein an unobstructed path through the hollow interior of the first pole section exists from the first aperture to the second aperture.

5. The squirrel repelling bird feeder according to claim 4 wherein the second pole section is a straight shaft that supports the first pole section at an elevated position;
   wherein the bottom of the second pole section is planted into the ground and oriented vertically to hold the squirrel repelling bird feeder upright.

6. The squirrel repelling bird feeder according to claim 5 wherein the second pole section comprises an anchor;
   wherein the anchor is located on the side of the second pole section directly beneath the bottom of the longer leg of the first pole section.

7. The squirrel repelling bird feeder according to claim 6 wherein the distance between the bottom of the longer leg and the anchor corresponds to the distance that the bird feeder drops for refilling;
   wherein the anchor prevents the cable from sliding through the first pole section when a cable lower termination is coupled to the anchor.

8. The squirrel repelling bird feeder according to claim 7 wherein the anchor comprises a peg or an inverted hook.

9. The squirrel repelling bird feeder according to claim 7 wherein the cable couples the bird feeder to the anchor on the second pole section in order to suspend the bird feeder out of reach of the squirrels;
   wherein a first cable end couples to the bird feeder and a second cable end couples to the cable lower termination;
   wherein the cable lower termination couples to the anchor on the second pole section to hold the bird feeder at the elevated position by preventing the cable from moving.

10. The squirrel repelling bird feeder according to claim 1
    wherein the cable lower termination decouples from the anchor to permit the weight of the bird feeder to pull the cable through the first pole section, thus lowering the bird feeder to a lowered position;

wherein movement of the cable is limited by the inability of the cable lower termination to pass through the first pole section.

11. The squirrel repelling bird feeder according to claim 10 wherein the cable lower termination is an annular ring.

12. The squirrel repelling bird feeder according to claim 11 wherein the outside edge of the baffle is warped downwards such that the baffle forms an inverted cone.

13. The squirrel repelling bird feeder according to claim 11
   wherein the bird feeder comprises a feed-dispensing body and a roof;
   wherein the bird feeder is a dispenser for the bird seed;
   wherein the bird feeder is suspended beneath the shorter leg such that the bird feeder is horizontally separated from the longer leg and from the second pole section.

14. The squirrel repelling bird feeder according to claim 13
   wherein the feed-dispensing body is a container for the bird seed;
   wherein the feed-dispensing body comprises one or more perches that are adapted for the birds to land upon;
   wherein the bird seed is dispensed through one or more seed apertures located on the feed-dispensing body.

15. The squirrel repelling bird feeder according to claim 14
   wherein the roof covers the bird seed to protect the bird seed from the weather;
   wherein the roof detaches from the feed-dispensing body so that the bird seed is placed into the feed-dispensing body.

16. The squirrel repelling bird feeder according to claim 15
   wherein the first pole section is detachable from the second pole section.

* * * * *